United States Patent
Mathew et al.

(10) Patent No.: US 11,722,409 B2
(45) Date of Patent: Aug. 8, 2023

(54) INTER-TUNNELING ENDPOINT (INTER-TEP) OVERLAY FORWARDING

(71) Applicant: VMware, Inc., Palo Alto, CA (US)

(72) Inventors: Subin Cyriac Mathew, San Jose, CA (US); Chidambareswaran Raman, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 159 days.

(21) Appl. No.: 17/306,810

(22) Filed: May 3, 2021

(65) Prior Publication Data

US 2022/0353180 A1 Nov. 3, 2022

(51) Int. Cl.
*H04L 45/64* (2022.01)
*H04L 45/745* (2022.01)
*G06F 9/455* (2018.01)
*H04L 12/46* (2006.01)

(52) U.S. Cl.
CPC .......... *H04L 45/64* (2013.01); *G06F 9/45558* (2013.01); *H04L 12/4633* (2013.01); *H04L 45/745* (2013.01); *G06F 2009/45595* (2013.01)

(58) Field of Classification Search
CPC ... H04L 45/64; H04L 45/745; H04L 12/4633; G06F 9/45558; G06F 2009/45595
See application file for complete search history.

(56) References Cited

U.S. PATENT DOCUMENTS

| | | | |
|---|---|---|---|
| 10,135,635 B2* | 11/2018 | Hira | H04L 45/38 |
| 10,491,516 B2* | 11/2019 | Ram | H04L 12/4641 |
| 10,560,380 B2* | 2/2020 | Tessmer | H04L 69/22 |
| 10,911,397 B2* | 2/2021 | Chandrashekhar | H04L 45/586 |
| 10,924,431 B2* | 2/2021 | Chandrashekhar | H04L 61/2521 |
| 10,972,386 B2* | 4/2021 | Mackie | H04L 12/4633 |
| 2017/0359259 A1* | 12/2017 | Bhaskar | H04L 45/745 |
| 2019/0036868 A1* | 1/2019 | Chandrashekhar | H04L 45/021 |
| 2019/0068493 A1* | 2/2019 | Ram | H04L 12/4641 |
| 2019/0215175 A1* | 7/2019 | Mathew | H04L 12/1886 |
| 2020/0067733 A1* | 2/2020 | Hira | H04L 12/4633 |
| 2020/0236039 A1* | 7/2020 | Nallapareddy | H04L 45/44 |
| 2020/0236041 A1* | 7/2020 | Yu | H04L 49/70 |
| 2021/0067484 A1* | 3/2021 | Parab | H04L 45/66 |
| 2021/0184970 A1* | 6/2021 | Hong | H04L 49/354 |
| 2021/0360474 A1* | 11/2021 | Chen | G06N 3/0454 |
| 2021/0377078 A1* | 12/2021 | Tregenza Dancer | H04L 45/586 |

* cited by examiner

*Primary Examiner* — Habte Mered
(74) *Attorney, Agent, or Firm* — Patterson + Sheridan, LLP

(57) ABSTRACT

The disclosure provides an approach for deploying an software defined networking (SDN) solution for overlay routing of traffic on a host with colocated a workload virtual machine (VM), addressable on an overlay network and VM addressable on an underlay network. An overlay interceptor in a hypervisor of the host can intercept traffic from a virtual switch and route the traffic to destination VM. The overlay interceptor can route the traffic directly, without the traffic exiting the host. A fast path can be created for the routing.

26 Claims, 6 Drawing Sheets

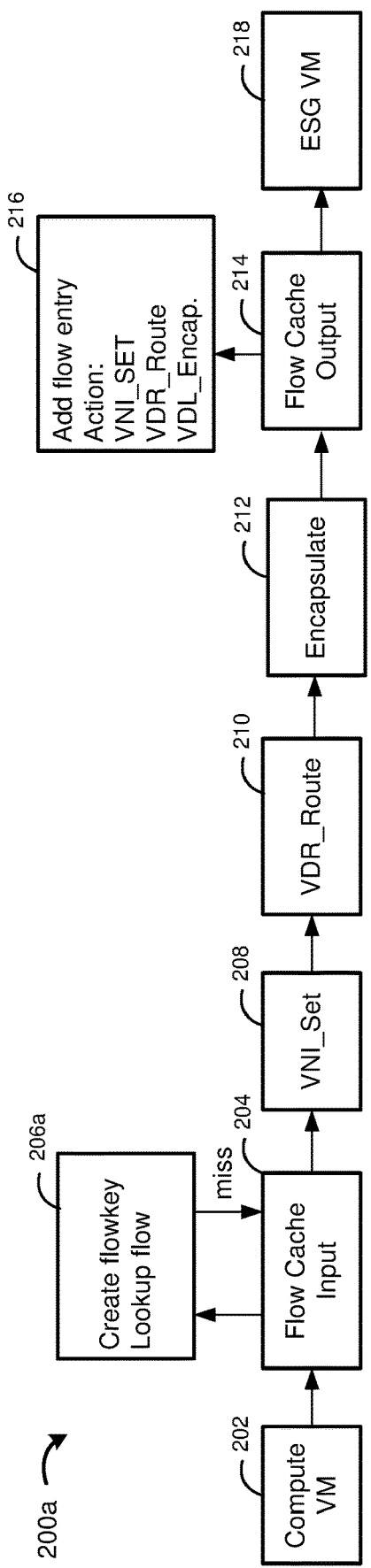
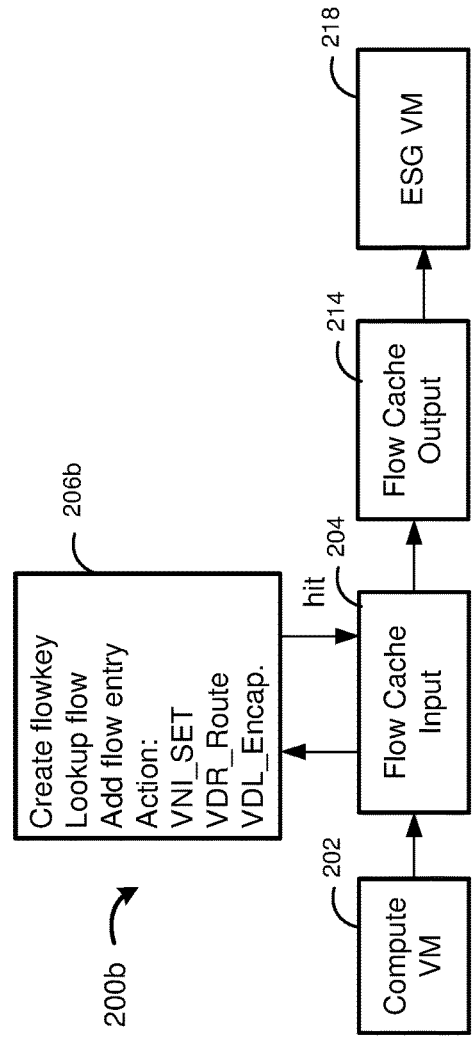
FIG. 2A
FIG. 2B

INTER-TUNNELING ENDPOINT (INTER-TEP) OVERLAY FORWARDING

BACKGROUND

Software defined networking (SDN) may be used to create a software defined datacenter (SDDC). An SDDC involves a plurality of hosts in communication over a physical network infrastructure of a data center (e.g., on-premise data center or a cloud data center). Each host has one or more virtualized endpoints such as virtual machines (VMs), containers, or other virtual computing instances (VCIs). These VCIs may be connected across the multiple hosts in a manner that is decoupled from the underlying physical network infrastructure. In one example, the VCIs may be connected to logical overlay networks that may span multiple hosts and that are decoupled from the underlying physical network infrastructure. The underlying physical network and the logical overlay network may use different addressing.

SDN involves the use of a management plane (MP) and a control plane (CP). The management plane is responsible for receiving network configuration input from, for example, an administrator and generating desired state data that specifies how the logical network should be implemented in the physical infrastructure. The control plane is responsible for determining the logical overlay network topology and maintaining information about network entities such as logical switches, logical routers, endpoints, etc. The logical topology information is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

Network virtualization makes it possible to programmatically create, provision, and manage networks all in software, using the underlying physical network as a simple packet-forwarding backplane. Network virtualization makes use of overlay technologies, which sit above the physical network hardware and work with the server hypervisor layer. Network and security services in software are distributed to hypervisors and "attached" to individual VMs in accordance with networking and security policies defined for each connected application.

Any arbitrary set of VMs in a datacenter may be placed in communication across a logical Layer 2 network by connecting them to a logical switch. Each logical switch corresponds to a virtual network identifier (VNI). A logical switch is collectively implemented by at least one virtual switch on each host that has a VM connected to the logical switch. The virtual switch on each host operates as a managed edge switch implemented in software by the hypervisor on each host.

When VMs communicate with each other over the overlay network, the packet is encapsulated, by a source virtual tunnel endpoint (VTEP) associated with the source VM, with destination IP address information of a destination VTEP associated with the destination VM. Such VMs that are part of the overlay network may be referred to as overlay VMs, compute VMs, or workload VMs. The source VTEP may operate on a source host that hosts the source VM, and the destination VTEP may operate on a destination host that hosts the destination VM. Accordingly, the packet is communicated between the source VTEP on the source host and the destination VTEP on the destination host via the physical underlay network. More particularly, forwarding tables at a virtual switch on the source host instruct the source VTEP to encapsulate packets received from a source VM. The original packet, also referred to as an inner packet having an inner header after encapsulation, may include a source IP address of the source VM, and a destination IP address of a destination VM, the source VM and destination VM having IP addresses addressable in the overlay network. The original packet from the source VM is encapsulated at the source VTEP with an outer header to include an outer destination IP address addressed to the destination host/VTEP using a mapping of VM IP addresses to host/VTEP IP addresses. The outer header further includes a source IP address of the source VTEP. The source VTEP and destination VTEP have IP addresses addressable in the physical underlay network. The physical network delivers the encapsulated packet to the destination host. A destination VTEP at the destination host can decapsulate the packet, remove the outer header, and then the local virtual switch delivers the original packet to the destination VM. Logical routers may extend the logical network across subnets or other network boundaries using IP routing in the logical domain.

The VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

VTEP services may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

A virtual local area network (VLAN) is a broadcast domain that is partitioned and isolated at Layer 2. Accordingly, VLANs can be used to segment a layer 2 network to separate traffic between different VLANs. For example, different VMs may be assigned different VLAN IDs corresponding to different VLANs.

In an SDDC, an Edge Services Gateway (ESG) provides routing services and connectivity to networks that are external to the overlay. The ESG may be implemented as a VM on a host, and referred to as an ESG VM. Packets sent by overlay VMs within the SDDC and destined for an external network are encapsulated and sent to the ESG using VTEPs as discussed. The ESG strips off the headers and performs routing to the external network.

In some instances, the ESG VM may be placed on a host where there are overlay VMs. In some cases, the ESG VM may be on a different virtual switch than the overlay VMs. In some cases, the ESG VM may be on the same virtual switch as the overlay VMs, but on a different VLAN. The ESG VM, unlike the overlay VMs, may be directly addressable with addressing of the physical underlay network, such as because the ESG VM implements a VTEP within the ESG VM. Accordingly, packets communicated in either direction between an ESG VM and an overlay VM colocated on the host with the ESG VM may be encapsulated to include addressing of the physical underlay network and then routed through the physical underlay network as discussed in order to reach the VM on the same host. This may have drawbacks, such as reduced throughput, as traffic for VMs on the same host is routed through the physical underlay network. In particular, routing the traffic for the colocated VMs through the physical underlay network can cause a bottleneck at a physical network interface (PNIC) of the host. Further, since all traffic external to the SDDC for VMs associated with the ESG VM goes through the host with the ESG VM placed on it, the additional traffic from the colocated VMs increases latency and decreases throughput. This problem is exacerbated when service VMs are also placed on the host that communicate traffic that further adds one or multiple round trips to the underlay network.

SUMMARY

Embodiments provide a method for the routing inter-TEP traffic in an overlay. Embodiments include overlay routing of traffic between workload VM(s) on a host, the workload VMs being addressable using addressing of an overlay network, and other VM(s) on the host that are addressable using addressing of an underlay network. Instead of routing such traffic via the underlay network, an overlay interceptor in the host hypervisor can intercept the traffic, identify that the traffic is destined for a colocated VM on the host, and forward the traffic to the destination (i.e., the workload VM or the underlay addressable VM). Thus, the traffic does not exit the host, thereby avoiding a bottleneck at the host NIC and avoiding using physical underlay network bandwidth and resources.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIG. 2A depicts a slow path flow caching for traffic from a VM routed to a colocated ESG VM.

FIG. 2B depicts a fast path flow caching for traffic from a VM routed to a colocated ESG VM.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for inter-TEP overlay forwarding. Configuring a host computer ("host") with an SDN software suite or solution in a data center, such as a public cloud data center, involves deploying a virtual switch on the host, where the virtual switch is configured to handle/forward logical overlay networking traffic ("overlay traffic") corresponding to data communicated on the logical overlay networks that one or more VMs executing on the host may be a part of. The virtual switch may also be configured to handle other types of traffic, such as traffic of a gateway device that may be implemented as a VCI on the host (e.g., also referred to as an edge services gateway (ESG) VCI or ESG VM). For example, a virtual switch may implement one or more logical switches or forwarding tables. Though certain aspects are described with respect to communication between an overlay VM and a ESG VM colocated on the same host, the aspects may be applicable to communication between an overlay VM and any suitable VCI addressable on a physical underlay network that are colocated on the same host. In aspects, an overlay interceptor in the host hypervisor may intercept and route traffic within the host between such colocated VMs, such that the traffic does not leave the host. This may reduce latency in the routing path, as well as avoid bottlenecks at a PNIC of the host.

Figure 1:
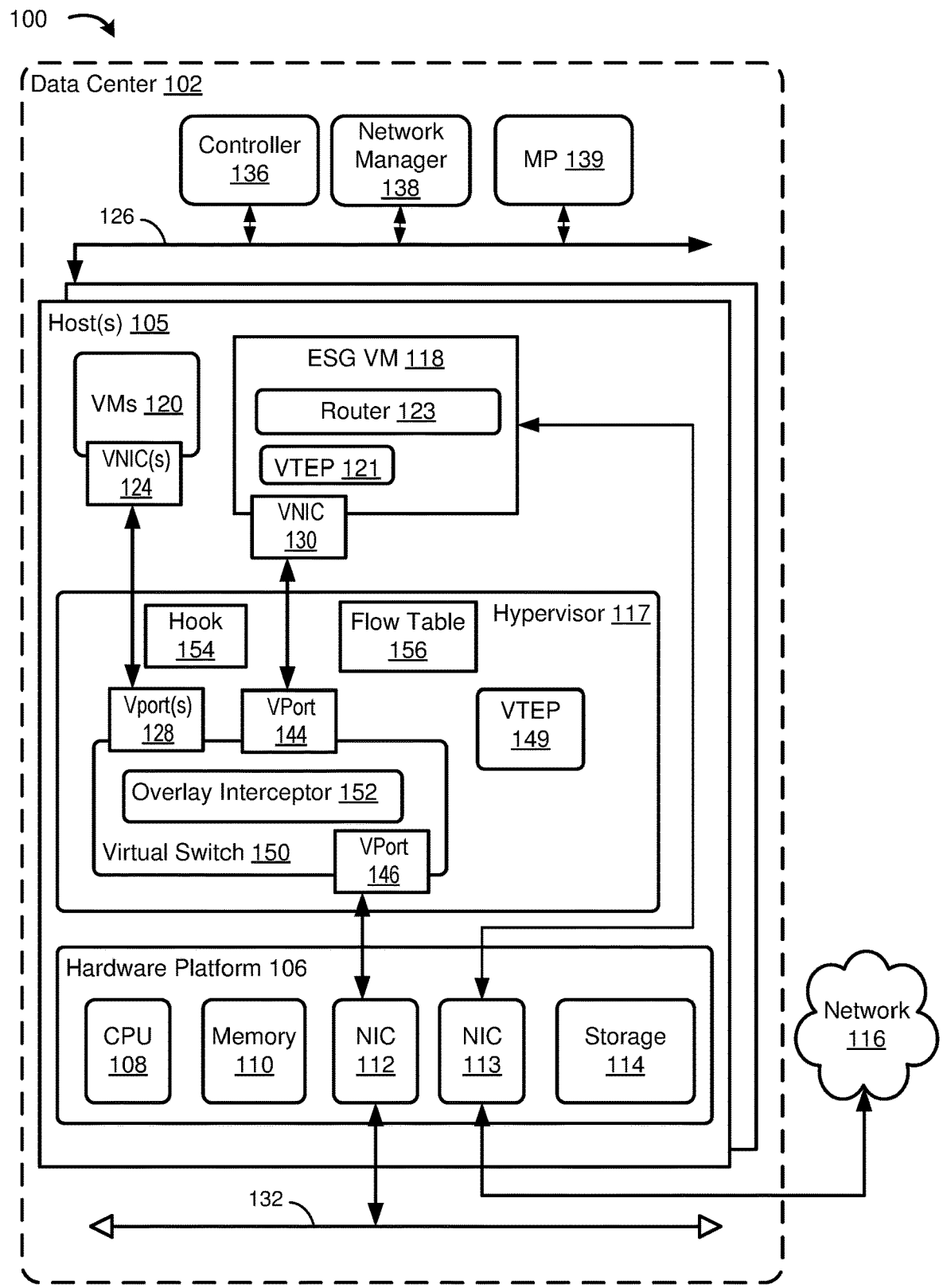
FIG. 1 depicts a block diagram of a host having an overlay interceptor for an active uplink and colocated VMs and an ESG VM, according to one or more embodiments of the technology described herein.

FIG. 1 depicts example physical and virtual network components in a network environment 100 in which embodiments of the present disclosure may be implemented. Networking environment 100 includes a set of networked computing entities, and may implement a logical overlay network. As shown, networking environment 100 includes a data center 102 and a network 116.

Network 116 may be an external network. Network 116 may a layer 3 (L3) physical network. Network 116 may be a public network, a wide area network (WAN) such as the Internet, a direct link, a local area network (LAN), another type of network, or a combination of these.

Data center 102 is an SDDC. Data center 102 may be an on-premises data center or a cloud data center. Data center 102 includes hosts 105, a management network 126, a data network 132, a controller 136, and a network manager 138. Data network 132 and management network 126 may be separate physical networks or different VLANs on the same physical network.

Data center 102 includes a management plane and a control plane. The management plane and control plane each may be implemented as single entities or may be implemented as distributed or clustered applications or components. Management plane (MP) 139 at least in part implements the management plane and controller 136 at least in part implements the control plane.

MP 139 is concerned with receiving network configuration input from an administrator and generating desired state data that specifies how a logical network should be implemented in the physical infrastructure of data center 102. For example, a management plane may include multiple computing devices or VCIs that implement management plane functions, and a control plane may include multiple central (or distributed) controller computers, VCIs, or processes that implement control plane functions.

Network manager 138 may communicate with host(s) 105 via management network 126. Network manager 138 may be a computer program or a plurality of programs that executes in one or more central servers in networking environment 100, or alternatively, network manager 138 may run in one or more VMs, e.g. in host 105. Network manager 138, as described herein, may carry out administrative tasks for networking environment 100, including managing host(s) 105, VCIs running within hosts, provisioning VCIs, transferring VCIs from one host to another host, transferring VCIs from networking environment 100 to another network or data center (not shown), and load balancing between hosts, and between networking environment 100 and other networks.

The control plane is concerned with determining the logical overlay network topology and maintaining information about network entities such as logical switches, logical routers, and endpoints, etc. The logical topology information is translated by the control plane into network configuration data that is then communicated to network elements of host 105 and host(s) 140. Controller 136 may be one of multiple controllers executing on various hosts in data center 102 that together implement the functions of the control plane in a distributed manner. Controller 136 collects and distributes information about the network from and to endpoints in the network. Controller 136 communicates with host 105 and host(s) 140 via management network 126, such as through control plane protocols.

Host(s) 105 may be communicatively connected to a physical or "underlay" network. As used herein, the term "underlay" is synonymous with "physical" and refers to physical components of networking environment 100. As used herein, the term "overlay" is used synonymously with "logical" and refers to the logical network implemented at least partially within networking environment 100.

Host(s) 105 in data center 102 may be geographically co-located servers on the same rack or on different racks in any arbitrary location in data center 102. Host 105 is configured to provide a virtualization layer, also referred to as a hypervisor 117, that abstracts processor, memory, storage, and networking resources of hardware platform 106 into multiple virtual machines, VM(s) 120.

The hypervisor architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 117 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although parts of the disclosure are described with reference to VMs, the teachings herein also apply to other types of VCIs, such as containers, Docker containers, data compute nodes, isolated user space instances, namespace containers, and the like.

Host 105 may be constructed on a server grade hardware platform 106, such as an x86 architecture platform. Hardware platform 106 of host 105 may include components of a computing device such as one or more processors (CPUs) 108, system memory 110, one or more network interfaces (PNICs 112 and 113), storage system 114, and other components (not shown). CPU 108 is configured to execute instructions, for example, executable instructions that perform one or more operations described herein and that may be stored in memory 110 and in storage system 114. Network interfaces 112 and 113 enable host 105 to communicate with other devices via a physical network, such as the management network 126, data network 132, and/or network 116.

As stated above, FIG. 1 shows a solution for inter-TEP overlay routing in a host 105 with colocated overlay VMs 120 and an ESG VM 118. As shown, host 105 includes VMs 120, ESG VM 118, and hypervisor 117. VMs 120 may be addressable using addressing of the overlay network.

ESG VM 118 is configured to operate as a gateway device that provides VMs 120 on host 105 and other components in data center 102 with connectivity to an external network, such as network 116. ESG VM 118 may be addressable using addressing of the physical underlay network (e.g., data network 132). ESG VM 118 may manage external public IP addresses for VMs 120. ESG VM 118 includes router 123 (e.g., a virtual router and/or a virtual switch) that routes traffic incoming to and outgoing from data center 102. ESG VM 118 also provides other networking services, such as firewalls, network address translation (NAT), dynamic host configuration protocol (DHCP), and load balancing. Such services may be provided by service VMs. ESG VM 118 may be referred to as a nested transport node, for example, as the ESG VM 118 does encapsulation and decapsulation. ESG VM 118 may be a stripped down version of a Linux transport node, with the hypervisor module removed, tuned for fast routing. The term, "transport node" refers to a virtual or physical computing device that is capable of performing packet encapsulation/decapsulation for communicating overlay traffic on an underlay network.

Figure 1A:
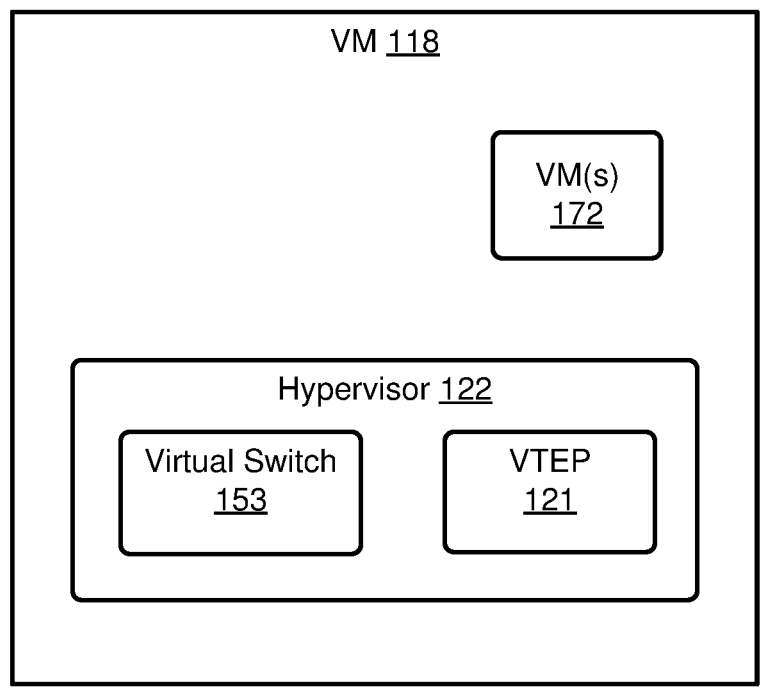
FIG. 1A depicts a block diagram of a nested transport node.
Figure 1B:
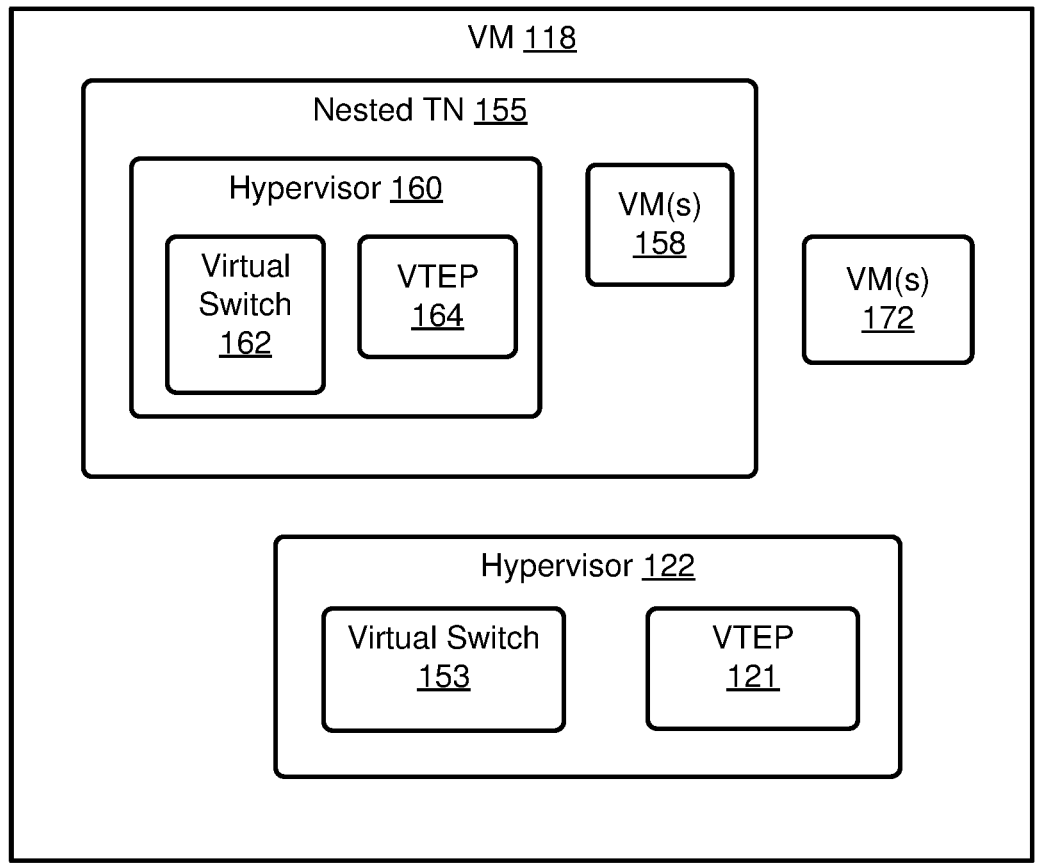
FIG. 1B depicts another block diagram of a nested transport node.

As shown, ESG VM 118 includes a VTEP 121 used by ESG VM 118 for encapsulating/decapsulating packets communicated with VMs in the logical overlay network. Although aspects of the present disclosure are described with respect to ESG VM 118, the techniques described herein may be applied to any VM 118 that is addressable on the underlay and colocated with the VMs 120 on the host 105. In an example, VM 118 may be configured as a Linux transport node or a Hyper-V transport node that includes a hypervisor 122 as shown in FIG. 1A, which may support additional VMs, such as VM 172, running within the VM 118. In some embodiments, VM 118 is a nested transport node with a hypervisor 122. As shown in FIG. 1A, VM 118 can include VM(s) 172, hypervisor 122 with virtual switch 153 and VTEP 121. In some aspects, there can be further nesting, such as VM 118 including a further nested transport node 155, as shown in FIG. 1B. As shown in FIG. 1B, nested TN 155 itself may include VM(s) 158, hypervisor 160 with virtual switch 162, and VTEP 164. The communication between workloads on the nested TNs, such as between VM(s) 158 and VMs 172 can be routed via vitual switch 162, VTEP 164, virtual switch 153, and VTEP 121 without any additional requirements from the underlay. FIG. 1B is merely illustrative of a hierarchal nested transport node. There may be any number of levels of nesting.

Referring back to FIG. 1, hypervisor 117 of host 105 includes a virtual switch 150, VTEP 149, and an overlay interceptor 152. Virtual switch 150 serves as a software-based interface between NIC 112 and other physical resources available on host 105. Virtual switch 150 may be a virtual standard switch (VSS) or a virtual distributed switch (VDS).

Each of VMs 120 and ESG VM 118, running on host 105 may include a virtual network interface card (VNIC), such as VNIC 124 and 130, which is responsible for exchanging packets between the VM and hypervisor 117. VNICs may be, in some cases, a software implementation of a physical NIC. Further, each of the VMs 120 is connected to a virtual port (vport) provided by virtual switch 150. For example, ESG VM 118 connects to the virtual port 144 of virtual switch 150 via VNIC 130 and VMs 120 connect to the virtual port(s) 128 of the virtual switch 150 via VNIC(s) 124.

As shown in FIG. 1, ESG VM 118 is located on the same host 105 as one or multiple workload VMs 120. ESG VM 118 and workload VMs 120 are connected to the same virtual switch 150. In some embodiments, the host 105 has only one active uplink to data network 132. ESG VM 118 may be on the same VLAN or a different VLAN than the VLAN of the host TEP, VTEP 149. Conventionally, as discussed, packets from workload VMs 120 to ESG VM 118 may be encapsulated with the IP address of ESG VM 118 as the destination and routed though the underlay data network 132 via NIC 112 and back to the ESG VM 118 again via NIC 112. Similarly, packets can be sent from ESG VM 118 and routed through the underlay data network 132 via NIC 112 and back to the workload VMs 120 again via NIC 112. Because ESG VM 118 is the gateway to the outside world, such as to network 116, all traffic to and from the data center 102 (e.g., North-South traffic) goes through PNIC(s) 112 of host 105 on which ESG VM 118 is placed. PNIC 112 sees additional traffic when these collocated workload VMs 120 communicate with the outside world. Such traffic becomes a bottleneck and reduces bandwidth at PNIC 112 to service packets from workload VMs on other hosts in the overlay domain.

The above problem is exacerbated when service VMs (e.g., such as load balancer VMs, router VMs, security VMs, firewall VMs, and the like), not shown in FIG. 1, are also placed on the same host 105. These service VMs sit in the path between workload VMs 120 and the ESG VM 118. This means that packets go from host 105 through underlay data network 132 to the service VM, get processed, and then again sent back through the underlay data network 132 to ESG VM 118 or VM 120 (depending on the direction of communication). The multiple round trips to underlay fabric and back further reduce throughput at PNIC 112.

According to embodiments of technology described herein, overlay interceptor 152 is introduced in hypervisor 117 of host 105. Overlay interceptor 152 may help reduce the bottlenecking and help to increase throughout by eliminating the trips to the underlay data network 132. Instead, overlay interceptor 152 can intercept the traffic, before it goes to the underlay data network 132, and route the traffic to the destination on host 105.

Network manager 138 (or MP 139, controller 136, etc.), identifies that ESG VM 118 is on the same host 105 as workload VMs 120. For example, whenever ESG VM 118 connects to the same virtual switch 150 as workload VMs 120, network manager 138 may get a notification. Network manager 138 may inform controller 136 of the notification.

Controller 136 pushes down information to inform host 105 that ESG VM 118 is colocated on host 105. For example, controller 136 may provide a unique TEP identifier of ESG VM 118, such as a VTEP label of VTEP 121 of ESG VM 118, to host 105 (e.g., including at least providing the identifier to overlay interceptor 152). The VTEP label maps to a current IP address of VTEP 121. Controller 136 pushes down the mapping of the VTEP label to VTEP 121 IP address. Controller 136 may also provide host 105 with a VLAN ID of the VLAN for ESG VM 118. The unique TEP identifier and the VLAN ID can be provided to host 105 as a port property. In the case of a nested TN, such as shown in FIG. 1B, VTEP 164 label may be pushed to hypervisor 122, while VTEP 121 label is pushed to overlay interceptor 152.

Overlay interceptor 152 may identify that an encapsulated packet is destined to a VM 120 or ESG VM 118 on the same virtual switch 150. Thus, instead of routing the packet to the destination through the underlay data network 132, overlay interceptor 152 can deliver the packet to the destination without the packet exiting host 105. For example, overlay interceptor 152 may intercept an encapsulated packet from a workload VM 120 and determine that the packet is destined for VTEP 121. Based on the mapping of the VTEP 121 IP address to the VTEP label pushed down to overlay interceptor 152 from controller 136, overlay interceptor 152 identifies workload VM 120 and VTEP 121 as colocated on host 105. Overlay interceptor 152 encapsulates the packet with the IP address of VTEP 121 and reinjects the packet into an ingress pipeline, back to virtual switch 150, instead of sending the packet out of PNIC 112 to data network 132. The packet is then sent to the destination, VTEP 121 in ESG VM 118, via VNIC 130 for decapsulation. Similarly, when a packet is destined to a workload VM 120, overlay interceptor 152 intercepts the packet from ESG VM 118 and routes the packet back to the virtual switch 150, which sends the encapsulated packet to VTEP 149 for decapsulation, and then virtual switch 150 routes the decapsulated packet to the destination VM 120. If the VLAN for VM 120 and ESG VM 118 are different, overlay interceptor 152 may set the VLAN of the packet to that of the destination VM VLAN before reinjecting the packet.

While aspects are described with respect to traffic flow between ESG VM 118, virtual switch 150, overlay interceptor 152, and VMs 120, it should be understood that the techniques discussed herein also apply to other embodiments, such as those including traffic with one or more services VMs, routers, or other modules in host 105. Further, while aspects are described with respect to an example with a single active uplink, it should be understood that the techniques discussed herein would also apply to a scenario with multiple active uplinks, for example, where ESG VM 118 and workload VMs are connected to different virtual switches. For example, overlay interceptor 152 may operate across virtual switches and reinject packets to the appropriate destination VM's virtual switch.

In some embodiments, the inter-TEP routing described above can be performed in a BUM (broadcast, unknown unicast and multicast) mode with multiple nested transport nodes connected to virtual switch 150 and colocated with workload VMs 120. For example, as discussed, each nested hypervisor (e.g., hypervisor 122, 160, 166, etc.) may include an associated TEP, and the TEP ID of said TEP can be pushed to virtual switch 150 to ensure routing of packets within host 105. In certain aspects, each appropriate virtual switch in the nesting chain (e.g., virtual switches 153, 162, 168, etc.) may implement a corresponding overlay interceptor . For example, instead of a packet from a workload VM 120 being addressed to an entity on an external network, the packet may be destined for a VM 172 addressable on the logical overlay network that is running in a VM 118 addressable on the physical underlay network that is also running on the same host 105 as workload VM 120. Like ESG VM 118, such a VM 118 may decapsulate the packet (using a VTEP 121) and instead of sending it to an external network entity, may direct the packet to VM 172.

Some aspects are described with respect to a slow path for traffic between ESG VM 118 and workload VMs 120. In some embodiments, flow caching may be used to establish a fast path and further shorten the path of the traffic between ESG VM 118 and workload VMs 120. A flow of packets may refer to a set of packets that have a same source addressing and destination addressing, meaning they have a same tuple (e.g., source IP, destination IP, source port, destination port, protocol) in their headers.

Virtual switch 150 may include a fast path and a slow path. The fast path may reside in the kernel of the host 105 operating system or hypervisor 117 and acts as a caching layer for efficient packet lookup and forwarding, while the slow path resides in the user space of host 105. In other embodiments, the slow path and fast path may not necessarily be in the user space and kernel space, respectively. For example, both the fast path and slow path may be in the user space, both the fast path and the slow path may be in the kernel space, etc. For each ingress packet, the fast path consults a flow table to search for and execute a list of actions associated with the packet. The actions may include forwarding the packet to a particular destination port(s) or modifying the packet etc. The fast path may be updated from time to time to include new features. Accordingly, subsequent packets of the flow match the flow key in the flow table, and the actions associated with the flow key are applied directly to the packets prior to forwarding the packet to the destination, resulting in a shorter path to the destination. This may result in fewer CPU cycles and improved performance.

FIG. 2A depicts a slow path flow cache I/O chain 200a for traffic from an overlay VM 202 routed to a colocated ESG VM 218, according to one or more embodiments of the technology described herein. In a slow path, the traffic goes through all of the modules in the chain between VM 202 to ESG VM 218, such as the service VMs, security VMs, policy modules, firewall modules, a virtual switch, an overlay interceptor , and the like. As a packet goes through various modules of packet processing, flow cache actions are added in a flow table as associated with a flow key corresponding to the packet.

Compute VM 202 sends traffic destined for ESG VM 218. Traffic enters the flow cache input 202 (e.g., hook 154 (FIG. 1)). It should be noted description of traffic or packets being "sent" from one component to another within a host 105 should be interpreted as being accessed or controlled by different components as the packets may reside in the same memory space or buffer in memory 110 while a descriptor or pointer is passed from one software module to the next. In some aspects, a hook 154 (FIG. 1) may be in hypervisor 117 between VNIC 124 and virtual switch 150, such as in vport 128. Hook 154 is an entry point in code implementing a network stack in the kernel to which virtual switch 150 is attached in order to process passing packets.

Accordingly, when packets arrive at hook 154, packets are processed by parsing the packets, using a packet parser, to extract relevant protocol headers from the packet, to create a flow key. Next, the flow key is stored locally (e.g., in a manner that is efficient for performing look-ups, e.g., using a hash table or a binary tree data structure). At lookup 206a, the flow key is used to perform a look-up of flow table 156 to see if a flow key corresponding to the packet (e.g., a flow key matching a tuple of header values for the packet) is present in the table. Flow table 156 matches a certain flow key to a particular set of actions (e.g., list of actions) that specifies the functions or actions that are to be executed on the packets matching the flow key. For example, flow table 156 may be a hash table that maps each flow key (e.g., or a hash value thereof) on the table to a certain list of actions. For the packet to be processed by the slow path, a flow key has not yet been generated for the flow table that corresponds to the packet, and the lookup results in a miss.

Certain packet processing functions are registered for the fast path to be called by hook 154 for a packet received at hook 154. As shown, at 208, a virtual network identifier (VNI) is set for the packet by overlay interceptor 152. At 210, the traffic is routed by a virtual router to set the destination MAC to correspond with ESG VM 218, which serves as the "next hop" for the packets. At 212, the traffic is encapsulated by overlay interceptor 152 with a destination IP for VTEP 121 in the encapsulation (outer) header. The VNI is set in the encapsulated packet. It should be noted that actions at 208-212 are exemplary, and other actions may be taken. At 214, the flow cache output for the packet results in creation of an entry in the flow table to establish a fast path for the flow where, at 216, the flow table is updated to include an entry with a flow key corresponding to the packet associated with the performed actions. The packet is forwarded to ESG VM 218. After performing the slow path, the actions are subsequently handled by the kernel on the fast path. Following the fast path, a packet from compute VM 202 goes to hypervisor 117 and is encapsulated and routed to ESG VM 218 without going to virtual switch 150 and overlay interceptor 152.

FIG. 2B depicts a fast path flow cache I/O chain 200b for traffic from VM 120 routed to colocated ESG VM 118. As shown, when a flow table includes an entry with a flow key matching a packet of a flow, the lookup results in a hit, at 206b, and the actions associated with the flow key in the flow table can be performed on the packet based on the entries in the flow table. In this case, the packet can be forwarded directly to ESG VM 118, at 216, without first going to the intermediate modules.

Figure 3A:
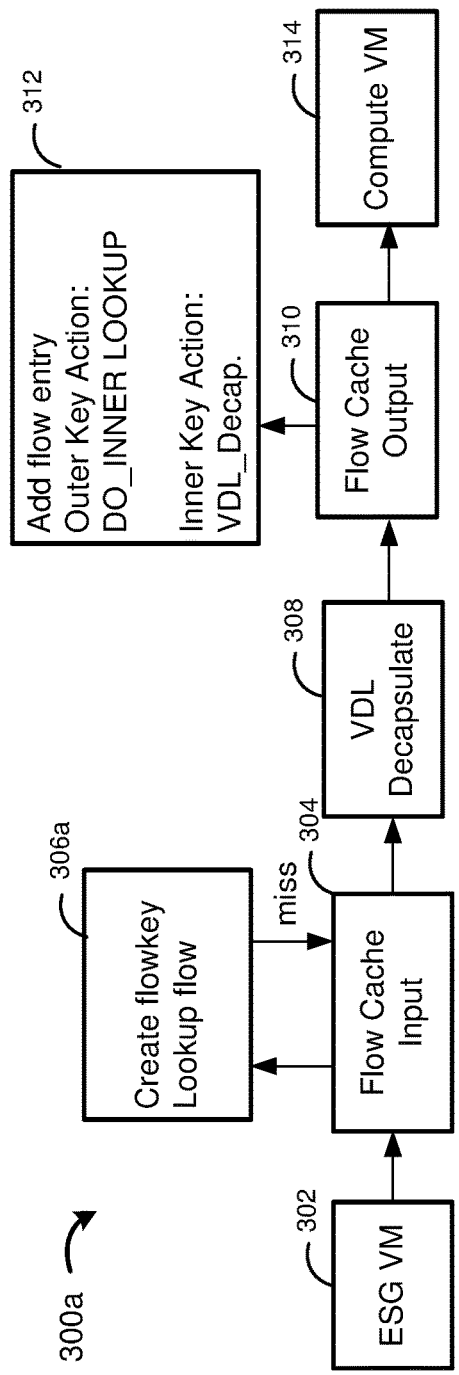
FIG. 3A depicts a slow path flow caching for traffic from an ESG VM routed to a colocated VM.

FIG. 3A depicts a slow path flow cache I/O chain for traffic from an ESG VM 118 routed to a colocated VM 120.

As shown, at 302, ESG VM 118 sends a packet destined for a compute VM 120. At 304, the packet enters the flow cache input. At 306a, a flow key lookup up in a flow table for the flow of the packet results in a miss, as discussed. At 308, the packet is decapsulated. At 310, the flow cache output for the packet results in creation of an entry in the flow table to establish a fast path for the flow where, at 312, the flow table is updated to include an entry with a flow key corresponding to the packet associated with the performed actions. The actions may include an outer key action and inner key action. At 314, the packet is forwarded to compute VM 120.

In certain aspects, at 312, multiple flow key entries are created for the packet in the flow table. In particular, as discussed, the packet received from ESG VM 118 is encapsulated, and as part of the slow path is decapsulated. Further processing performed on the packet may be based on the inner header values of the packet indicating the packet is destined for the particular compute VM. Not all traffic that matches the flow indicated in the outer header is destined for the same compute VM, and therefore may be subject to different processing. For example, packets from ESG VM 118 destined to the same VTEP, but to different VMs associated with that VTEP, may have the same tuples in the outer header of the packet, therefore matching the same flow key entry. However, the inner header of the packets may have different tuples, and such packets may be subject to different processing/actions. Accordingly, in certain aspects, a first entry is created in the flow table having a first flow key corresponding to the outer header of the packet. The first entry may, as an associated action, indicate to perform another flow key lookup in the flow table for a second entry having a second flow key matching the inner header of the packet. The second entry, therefore, may be added to the flow table that associates the second flow key with actions to be performed on the packet.

Figure 3B:
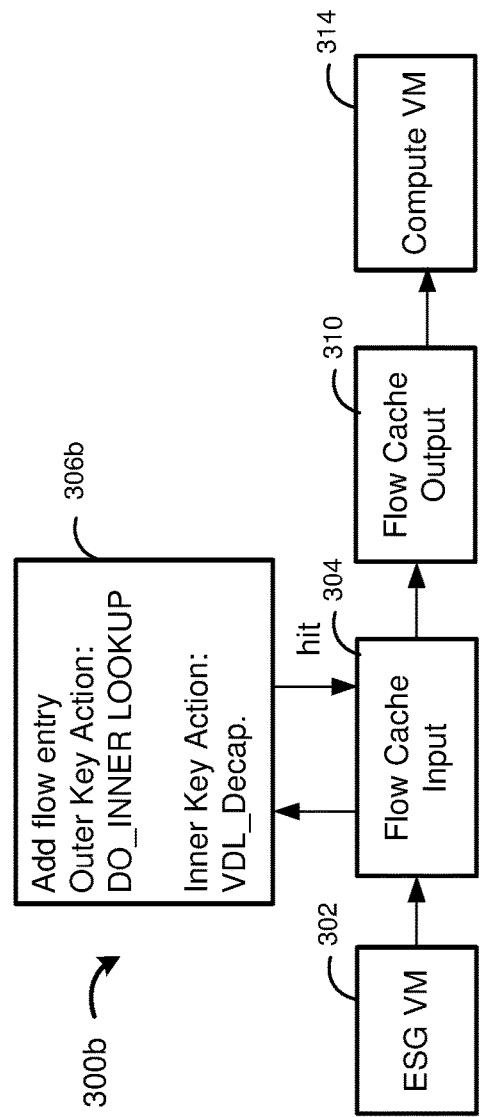
FIG. 3B depicts a fast path flow caching for traffic from an ESG VM routed to a colocated VM.

FIG. 3B depicts a fast path flow cache I/O chain for traffic from an ESG VM 118 routed to a colocated VM 120. As shown, when a flow table includes an entry with a flow key matching a packet of a flow, the lookup results in a hit, at 306b, and the actions in the flow table can be followed based on the entries in the flow table. In this case, the traffic can be forwarded directly to the compute VM, at 314, without first going to the intermediate modules. As discussed, the actions may include performing another lookup in the flow table for a second flow key matching an inner header of the packet, and the actions performed may be associated with the second flow key.

Figure 4:
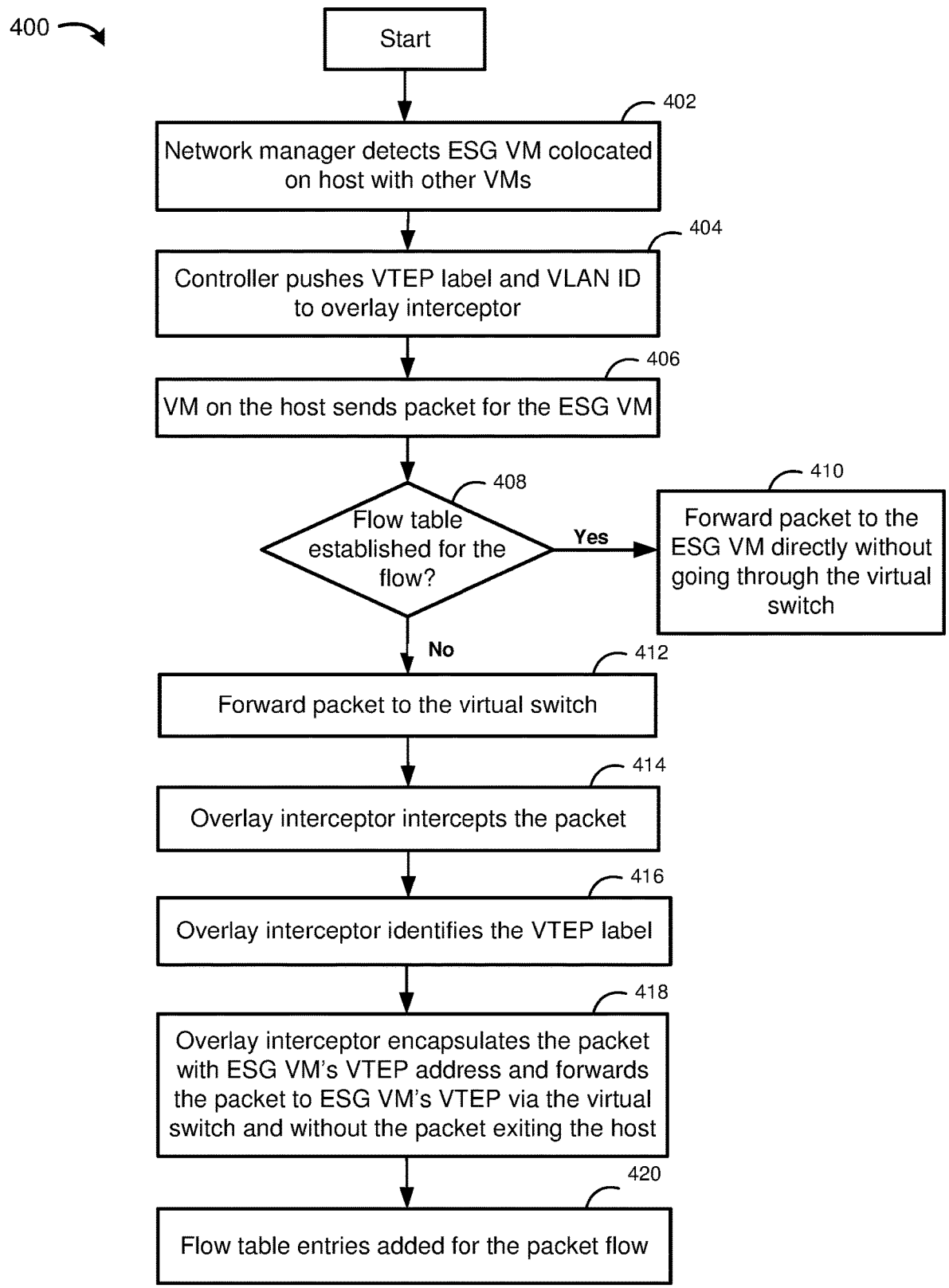
FIG. 4 depicts a flowchart of example operations for inter-TEP overlay forwarding.

FIG. 4 depicts a flowchart of example operations 400 for inter-TEP overlay forwarding.

At 402, network manager 138 detects ESG VM 118 connects to the same virtual switch 150 as workload VMs 120 on host 105. At 404, controller 136 pushes the label of VTEP 121 and the VLAN ID of ESG VM 118 to overlay interceptor 152.

At 406, workload VM 120 sends a packet to ESG VM 118. For example, the packet may be for the ESG VM 118 to forward to a destination outside the data center via network 116.

At 408, it is determined whether there is a flow table established for the flow. The packet header is parsed to perform a lookup if there exists a matching flow key in a flow table. If a table table has been established, the lookup is a hit and entries are found in a flow table, then, at 410, the packet is processed according to the actions in the flow table, and the packet is forwarded to ESG VM 118 without going through virtual switch 150. On the other hand, if a flow table has not been established, the lookup is a miss, as there is not a fast path currently for the packet, and the packet continues, at 412, to virtual switch 150.

At 414, overlay interceptor 152 intercepts the packet and, at 416, identifies that the packet is destined to colocated ESG VM 118. For example, overlay interceptor 152 can identify that ESG VM 118 is colocated on host 105 based on the received lavel for VTEP 121. Thus, at 418, overlay interceptor 152 forwards the packet to ESG VM 118 though virtual switch 150 without the packet exiting host 105. Further, at 420, one or more entries can be added in the flow table to establish a fast path for the flow of the packet.

Similar operations as operations 400 are performed for traffic received at the ESG VM 118 and destined for colocated workload VMs 120.

Accordingly, the aspects described herein provide a technical solution to a technical problem associated with overlay routing of traffic for a host with colocated workload VMs and ESG VM. More specifically, implementing the aspects herein allow for routing the traffic between the workload VMs and the ESG VM without the traffic exiting the host, thereby reducing a bottleneck and increasing bandwidth on the uplink(s) of the host. The solution can be implemented even on a host where the workload VMs and the ESG VM share the same virtual switch and use the same VLAN, thereby reducing the overhead of provisioning an additional VLAN.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein may be useful machine operations. In addition, one or more embodiments of the technology described herein may relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of routing traffic in a logical overlay network implemented on an underlay network, comprising:
    receiving, by an overlay interceptor running on a hypervisor layer of a first host, a packet from a first virtual computing instance (VCI) on the first host, wherein the packet is destined for a second VCI running on a second host in a network external to the logical overlay network, wherein the first VCI is addressable on the logical overlay network, addressing of the underlay network being different than addressing of the logical overlay network;
    encapsulating, at the hypervisor layer of the first host, the packet with an outer header and an inner header, the outer header including addresses associated with the underlay network, and the inner header including addresses associated with the logical overlay network; and
    forwarding the encapsulated packet to a third VCI, by the overlay interceptor and entirely within the first host, based on the first VCI and the third VCI running on the first host, wherein the third VCI is addressable on the underlay network.

2. The method of claim 1, further comprising:
    receiving, at the overlay interceptor, a virtual tunnel endpoint (VTEP) label associated with the third VCI, wherein the forwarding is based on the VTEP label.

3. The method of claim 2, further comprising:
    transmitting an identifier of the third VCI based on the one of the third VCI being implemented on the first host, wherein receiving the VTEP label is in response to the transmitting the identifier.

4. The method of claim 1, wherein the third VCI comprises a fourth VCI running in the third VCI, wherein the fourth VCI is addressable on the logical overlay network.

5. The method of claim 1, further comprising:
    parsing a header of the packet to determine if values in the header have a matching flow key in a flow table; and
    adding a first flow key corresponding to the values in the header as associated with one or more actions to the flow table when the matching flow key is not found in the flow table.

6. The method of claim 5, further comprising:
    receiving a second packet at the first host;
    parsing a second header of the second packet and determining second values in the second header match the first flow key in the flow table; and
    applying the one or more actions to the second packet based on the determining the second values in the second header match the first flow key.

7. The method of claim 5, wherein the packet is encapsulated and comprises an outer header and an inner header, the outer header including addresses associated with the underlay network, and the inner header including addresses associated with the logical overlay network, wherein the header is the inner header and the first flow key corresponds to the inner header, and further comprising:
    adding a second flow key corresponding to values in the outer header as associated with a first action to the flow table when the matching flow key is not found in the flow table, the first action indicating to search the flow table for a second matching flow key matching the values in the inner header.

8. The method of claim 1, wherein the third VCI is an edge services gateway (ESG) virtual machine (VM).

9. A non-transitory computer readable medium comprising instructions that, when executed by one or more processors of a computing system, cause the computing system to perform a method for routing traffic in a logical overlay network implemented on an underlay network, the method comprising:
    receiving, by an overlay interceptor running on a hypervisor layer of a first host, a packet from a first virtual computing instance (VCI) on the first host, wherein the packet is destined for a second VCI running on a second host in a network external to the logical overlay network, wherein the first VCI is addressable on the logical overlay network, addressing of the underlay network being different than addressing of the logical overlay network;

encapsulating, at the hypervisor layer of the first host, the packet with an outer header and an inner header, the outer header including addresses associated with the underlay network, and the inner header including addresses associated with the logical overlay network; and forwarding the encapsulated packet to a third VCI, by the overlay interceptor and entirely within the first host, based on the first VCI and the third VCI running on the first host, wherein the third VCI is addressable on the underlay network.

10. The non-transitory computer readable medium of claim 9, wherein the method further comprises:
receiving, at the overlay interceptor, a virtual tunnel endpoint (VTEP) label associated with the third VCI, wherein the forwarding is based on the VTEP label.

11. The non-transitory computer readable medium of claim 10, wherein the method further comprises:
transmitting an identifier of the third VCI based on the one of the third VCI being implemented on the first host, wherein receiving the VTEP label is in response to the transmitting the identifier.

12. The non-transitory computer readable medium of claim 9, wherein the third VCI comprises a fourth VCI running in the third VCI, wherein the fourth VCI is addressable on the logical overlay network.

13. The non-transitory computer readable medium of claim 9, wherein the method further comprises:
parsing a header of the packet to determine if values in the header have a matching flow key in a flow table; and
adding a first flow key corresponding to the values in the header as associated with one or more actions to the flow table when the matching flow key is not found in the flow table.

14. The non-transitory computer readable medium of claim 13, wherein the method further comprises:
receiving a second packet at the first host;
parsing a second header of the second packet and determining second values in the second header match the first flow key in the flow table; and
applying the one or more actions to the second packet based on the determining the second values in the second header match the first flow key.

15. The non-transitory computer readable medium of claim 13, wherein the packet is encapsulated and comprises an outer header and an inner header, the outer header including addresses associated with the underlay network, and the inner header including addresses associated with the logical overlay network, wherein the header is the inner header and the first flow key corresponds to the inner header, the method further comprising:
adding a second flow key corresponding to values in the outer header as associated with a first action to the flow table when the matching flow key is not found in the flow table, the first action indicating to search the flow table for a second matching flow key matching the values in the inner header.

16. The non-transitory computer readable medium of claim 9, wherein the third VCI is an edge services gateway (ESG) virtual machine (VM).

17. A system comprising one or more processors and a non-transitory computer readable medium comprising instructions that, when executed by the one or more processors, cause the system to perform a method for routing traffic a logical overlay network implemented on an underlay network, the method comprising:

receiving, by an overlay interceptor running on a hypervisor layer of a first host, a packet from a first virtual computing instance (VCI) on the first host, wherein the packet is destined for a second VCI running on a second host in a network external to the logical overlay network, wherein the first VCI is addressable on the logical overlay network, addressing of the underlay network being different than addressing of the logical overlay network;

encapsulating, at the hypervisor layer of the first host, the packet with an outer header and an inner header, the outer header including addresses associated with the underlay network, and the inner header including addresses associated with the logical overlay network; and forwarding the encapsulated packet to a third VCI, by the overlay interceptor and entirely within the first host, based on the first VCI and the third VCI running on the first host, wherein the third VCI is addressable on the underlay network.

18. A method of routing traffic in a logical overlay network implemented on an underlay network, comprising:
receiving, by an overlay interceptor running on a first host, a packet from a second virtual computing instance (VCI) running on a second host in a network external to the logical overlay network, wherein the packet is received via a third VCI running on the first host and destined for a first VCI running on the first host, wherein the third VCI is addressable on the underlay network to which the first host is connected, and wherein the first VCI is addressable on the logical overlay network, addressing of the underlay network being different than addressing of the logical overlay network; and forwarding the packet to the first VCI, by the overlay interceptor and entirely within the first host, based on the first VCI and the third VCI running on the first host.

19. The method of claim 18, wherein the packet is encapsulated and comprises an outer header and an inner header, the outer header including addresses associated with the underlay network, and the inner header including addresses associated with the logical overlay network.

20. The method of claim 18, further comprising:
receiving, at the overlay interceptor, a virtual tunnel endpoint (VTEP) label associated with the third VCI, wherein the forwarding is based on the VTEP label.

21. The method of claim 20, further comprising:
transmitting an identifier of the third VCI based on the one of the third VCI being implemented on the first host, wherein receiving the VTEP label is in response to the transmitting the identifier.

22. The method of claim 18, wherein the third VCI comprises a fourth VCI running in the third VCI, wherein the fourth VCI is addressable on the logical overlay network.

23. The method of claim 18, further comprising:
parsing a header of the packet to determine if values in the header have a matching flow key in a flow table; and
adding a first flow key corresponding to the values in the header as associated with one or more actions to the flow table when the matching flow key is not found in the flow table.

24. The method of claim 23, further comprising:
receiving a second packet at the first host;
parsing a second header of the second packet and determining second values in the second header match the first flow key in the flow table; and applying the one or more actions to the second packet based on the determining the second values in the second header match the first flow key.

25. The method of claim 23, wherein the packet is encapsulated and comprises an outer header and an inner header, the outer header including addresses associated with the underlay network, and the inner header including addresses associated with the logical overlay network, wherein the header is the inner header and the first flow key corresponds to the inner header, and further comprising:

adding a second flow key corresponding to values in the outer header as associated with a first action to the flow table when the matching flow key is not found in the flow table, the first action indicating to search the flow table for a second matching flow key matching the values in the inner header.

26. The method of claim 18, wherein the third VCI is an edge services gateway (ESG) virtual machine (VM).

* * * * *